(12) United States Patent
Johnson

(10) Patent No.: US 9,068,763 B2
(45) Date of Patent: Jun. 30, 2015

(54) SOLAR ENERGY RECEIVER

(71) Applicant: Neldon P. Johnson, Deseret, UT (US)

(72) Inventor: Neldon P. Johnson, Deseret, UT (US)

(73) Assignee: Black Night Enterprises, Inc., Charleston, Nevis ( * ) Notice: Subject to any disclaimer, the term of this patent is extended or adjusted under 35 U.S.C. 154(b) by 389 days.

(21) Appl. No.: 13/772,272

(22) Filed: Feb. 20, 2013

(65) Prior Publication Data

US 2014/0230808 A1    Aug. 21, 2014

(51) Int. Cl.
*F24J 2/04* (2006.01)
*F24J 2/15* (2006.01)

(52) U.S. Cl.
CPC *F24J 2/0488* (2013.01); *F24J 2/15* (2013.01); *Y02E 10/44* (2013.01)

(58) Field of Classification Search
CPC ..... F24J 2/0488; F24J 2/15; F24J 2002/0405; F24J 2002/0416; Y02E 10/44; Y02E 10/47
See application file for complete search history.

(56) References Cited

U.S. PATENT DOCUMENTS

| | | | |
|---|---|---|---|
| 4,026,273 A | | 5/1977 | Parker |
| 4,137,903 A | * | 2/1979 | Annett, II ............... 126/652 |
| 4,257,401 A | | 3/1981 | Daniels |
| 4,494,529 A | | 1/1985 | Lew |
| 4,723,535 A | | 2/1988 | Lew |
| 4,892,593 A | | 1/1990 | Lew |
| 5,062,899 A | | 11/1991 | Kruer |
| 5,253,637 A | * | 10/1993 | Maiden ................. 126/696 |
| 6,516,794 B2 | | 2/2003 | Karni et al. |
| 7,140,181 B1 | | 11/2006 | Jensen et al. |
| 2006/0193066 A1 | * | 8/2006 | Prueitt ................. 359/853 |

* cited by examiner

*Primary Examiner* — Alfred Basichas
(74) *Attorney, Agent, or Firm* — J. David Nelson

(57) ABSTRACT

Solar receiver having a receiver funnel, a solar absorber, and an absorber rotation drive mechanism. The receiver funnel has a funnel entrance and a funnel exit. The solar absorber may have a spherical shape and has an absorber rotation axis. The solar absorber is rotatably positioned in the funnel exit. The solar absorber has an internal absorber fluid chamber, an absorber fluid intake and an absorber fluid outlet. The absorber rotation drive mechanism provides for rotating the solar absorber about the absorber rotation axis.

16 Claims, 4 Drawing Sheets

SOLAR ENERGY RECEIVER

FIELD OF THE INVENTION

This invention is in the field of devices for collecting solar energy and particular in the field of devices for receiving and absorbing concentrated solar energy.

BACKGROUND OF THE INVENTION

Incident solar radiation may be focused for solar energy collection purposes by mirrors, conventional lenses or Fresnel lenses in various ways known in the art. These collectors all require a device providing for the reception and absorption of the focused incident solar radiation. Solar collectors utilizing energy transfer to a fluid medium that in turn is used to supply energy to a turbine, require a device providing for the efficient reception and absorption of the focused incident solar radiation and for the efficient transfer of that energy to the liquid medium.

Solar collectors which utilize Fresnel lenses, such as the solar collectors disclosed in U.S. patent application Ser. No. 10/621,933, Publication No. 20050011513, by the present inventor, regardless of the precision with which the Fresnel lens components are manufactured, experience some unavoidable scatter in attempting to focus incident solar radiation. Scatter is also induced by manufacturing irregularities and installation errors for collectors using mirrors and conventional lenses. The result is that, regardless of the type of collector used, all of the incident solar radiation will likely not be focused precisely to a common focal point. Hence, a solar receiver is needed to accept the focused solar radiation with scatter, further concentrate the focused radiation with scatter, and ultimately to direct the radiation to a solar absorber where the energy can be absorbed and transferred to a fluid medium.

The solar receiver also needs a solar absorber component that will efficiently absorb the concentrated incident solar radiation and efficiently transfer it to the liquid medium, while minimizing radiative and convective losses.

An objective of the present invention is to provide a solar receiver having a receiver funnel to receive, from a solar collector, focused solar radiation with scatter and to further concentrate and direct the solar radiation to a solar absorber for absorption.

A further objective of the present invention is to provide a solar receiver having a solar absorber element providing for the efficient absorption of focused and concentrated incident solar radiation, the efficient transfer of the absorbed solar energy to a liquid medium, and the minimization of radiative and conductive losses.

SUMMARY OF THE INVENTION

Regardless of the type of solar collector, the objective of the primary lens element and the associated structure is to provide for the incident solar radiation to be focused so that it may be cost effectively and efficiently absorbed and utilized as an energy source. Ray scatter resulting from imperfect focusing of the incident solar radiation by a primary lens structure presents a problem for a solar absorber. Unless the solar absorber is oversized, some of the focused incident solar radiation will miss the solar absorber.

A preferred embodiment of the present invention has a receiver funnel with a funnel entrance which provides for the admission of the scattered solar radiation. The receiver funnel has a reflective chamber with a uniform cone shape or a parabolic cone shape having a funnel reflective surface which will redirect the inadequately focused or scattered rays to a solar absorber. The rays which are not directed toward the solar absorber enter the funnel entrance at various positions and angles of incidence less than 90° for all or most of the focused incident radiation, and all or most of the focused incident solar radiation will be reflected into and thereby trapped by the receiver funnel.

A solar absorber is positioned in the funnel exit but positioned with a clearance from the funnel exit such as to allow for absorber independent movement. For preferred embodiments, the absorber movement will preferably be an absorber rotation of the solar absorber about an absorber rotation axis. For a preferred embodiment, the absorber rotation axis is perpendicular to the funnel axis which is laterally centered in the receiver funnel. Preferred embodiments of the solar absorber have a generally spherical shape.

Preferred embodiments of the solar absorber have an external surface with a texture, color, and a thermal conductivity such as to maximize the absorption of the concentrated funnel radiation. Absorbed energy is transmitted by the absorber wall to the absorber transfer surface where the absorbed energy is transferred by the absorber wall to absorber transfer fluid. The absorber transfer fluid is supplied to an absorber fluid chamber by an absorber fluid supply tube having a fluid supply tube discharge, which is also the absorber fluid intake. Preferably, fluid flow in the absorber fluid chamber will be turbulent flow providing for better mixing and contact between the absorber transfer fluid and the absorber transfer surface. This will provide for more efficient transfer of the absorbed energy into the absorber transfer fluid. The solar absorber may also incorporate copper wool or other heat transfer aid attached to the absorber transfer surface and extending into the absorber fluid chamber to aid in the rapid and efficient transfer of heat from the absorber wall into the absorbing transfer fluid.

The heated transfer fluid exits the absorber fluid chamber through the absorber fluid outlet which is firmly structurally attached to the absorber wall. An absorber rotation drive mechanism, which may consist of an exit pipe sprocket attached to the heated fluid exit pipe, an absorber rotation chain and a motorized absorber drive with interacts with the absorber drive chain by a drive sprocket. A variable speed drive, gear box, or other speed control mechanism may be used to control the speed of absorber rotation of the solar absorber.

A mechanical seal with a fluid seal between the rotating fluid exit pipe and the fixed absorber fluid discharge pipe provides for the heated transfer fluid to flow from the rotating fluid exit pipe into the fixed absorber fluid discharge pipe. The absorber fluid discharge pipe conducts the heated transfer fluid to the a heat transfer device, steam turbine, or other energy out take system.

The temperature and the flow rate of the heated transfer fluid may be measured and transmitted to an absorber drive controller. The fluid temperature signal and the fluid flow rate signal may be used by to determine the rate of the absorber rotation.

DETAILED DESCRIPTION OF PREFERRED EMBODIMENTS

Figure 1:
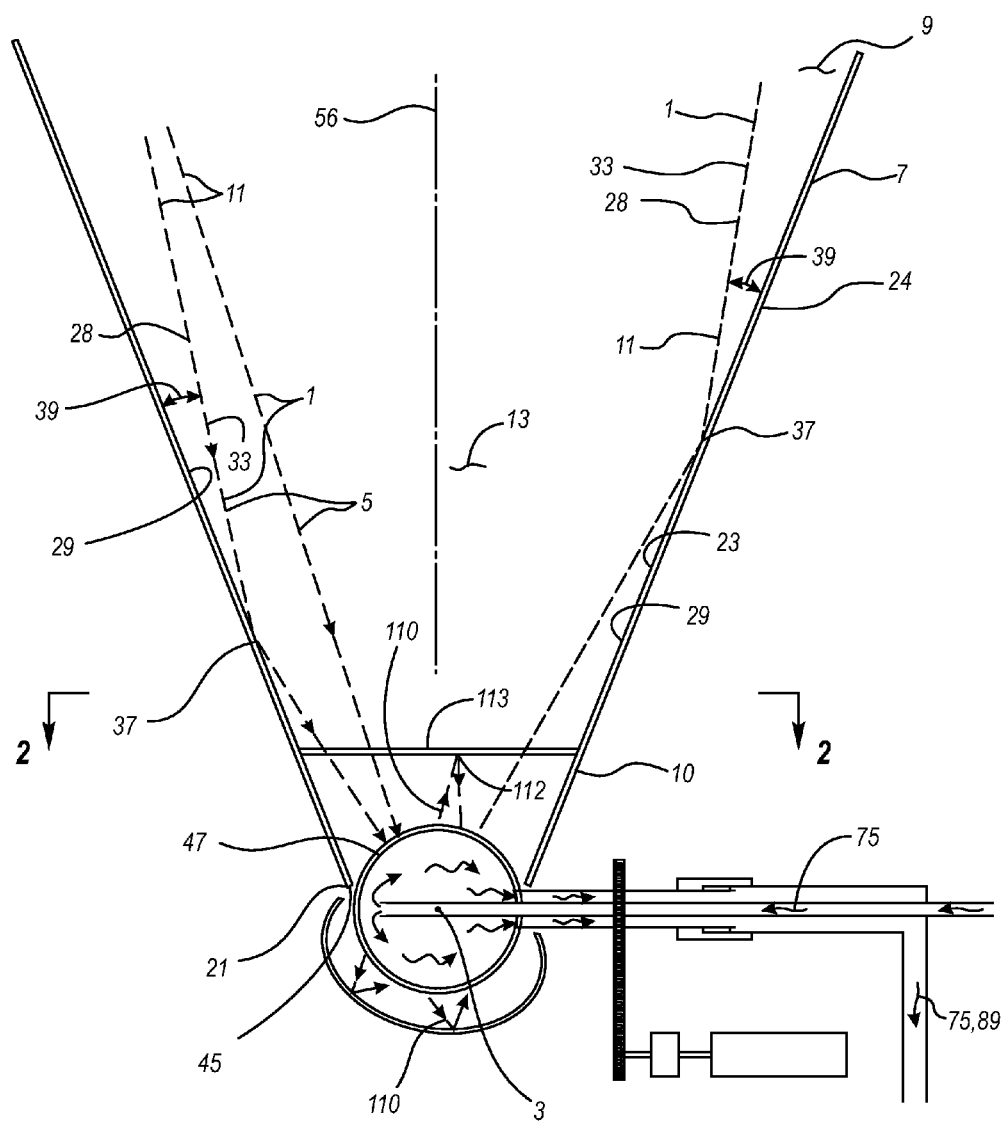
FIG. 1 is a vertical cross-section of a preferred embodiment of a solar receiver of the present invention with a uniformly decreasing chamber diameter.

Regardless of the type of solar collector, the objective of the primary lens element and the associated structure is to provide for the incident solar radiation to be focused so that it may be cost effectively and efficiently absorbed. Referring first to FIG. 1, generally focused incident solar radiation 1 converging upon a focal point 3 is shown. Ray scatter 5 resulting from imperfect focusing of the incident solar radiation by a primary lens structure presents a problem for a solar absorber. Unless the solar absorber is oversized, some of the focused incident solar radiation will miss the solar absorber.

Figure 2:
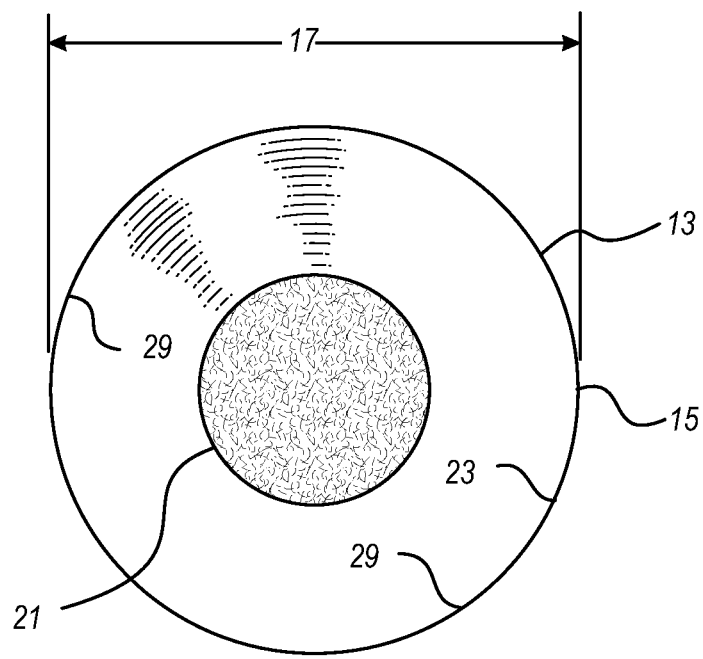
FIG. 2 is a top plan view of the preferred embodiment of the solar receiver of the present invention shown in FIG. 1.

For the embodiment of the present invention shown in FIG. 1, a receiver funnel 7 having a funnel entrance 9 provides for the admission of the scattered solar radiation 11. The embodiment of the receiver funnel 7 of the solar receiver 10 shown in FIG. 1 has a reflective chamber 13 with a circular chamber cross section 15 having a chamber diameter 17 as shown in FIG. 2 which decreases uniformly from the funnel entrance 9 to the funnel exit 21. The receiver funnel 7 has a reflective surface 23. Other embodiments of the receiver funnel may have a parabolic reflective surface 23 as shown on FIG. 3. Receiver funnel 7 embodiments other than the uniform cone shape 24 of FIG. 1 and the parabolic cone shape 26 of FIG. 3 having a funnel reflective surface 23 which will redirect the out-of-focus rays 28, which will be known to persons of ordinary skill in the art in view of the disclosures made in this specification and the drawings, may also be used.

The funnel reflective surface 23 may be polished, coated or otherwise mirrorized to provide for high reflectivity and associated minimal absorption by the reflective chamber walls 29. A structure of the receiver funnel 7 preferred by the inventor is an aluminum cone with a highly polished funnel reflective surface 23.

The inadequately focused, scattered rays 33 which are not directed toward the solar absorber 47, enter the funnel entrance 9 at various positions and angles of incidence and strike the chamber reflective surface 23 at a first reflective point 37 with respective first reflective angles 39. Because the first reflective angle 39 will be less than 90° for all or most of the focused incident radiation 1 from the solar collector, all or most of the generally focused incident radiation 1 will be reflected into and thereby trapped by the receiver funnel 7. The shape of the receiver funnel 7, the position of the first reflective point 37, and the magnitude of the first reflective angle 39, for each incident scattered ray 33 will determine the number of reflections that the ray will experience before striking the solar absorber 47.

Figure 3:
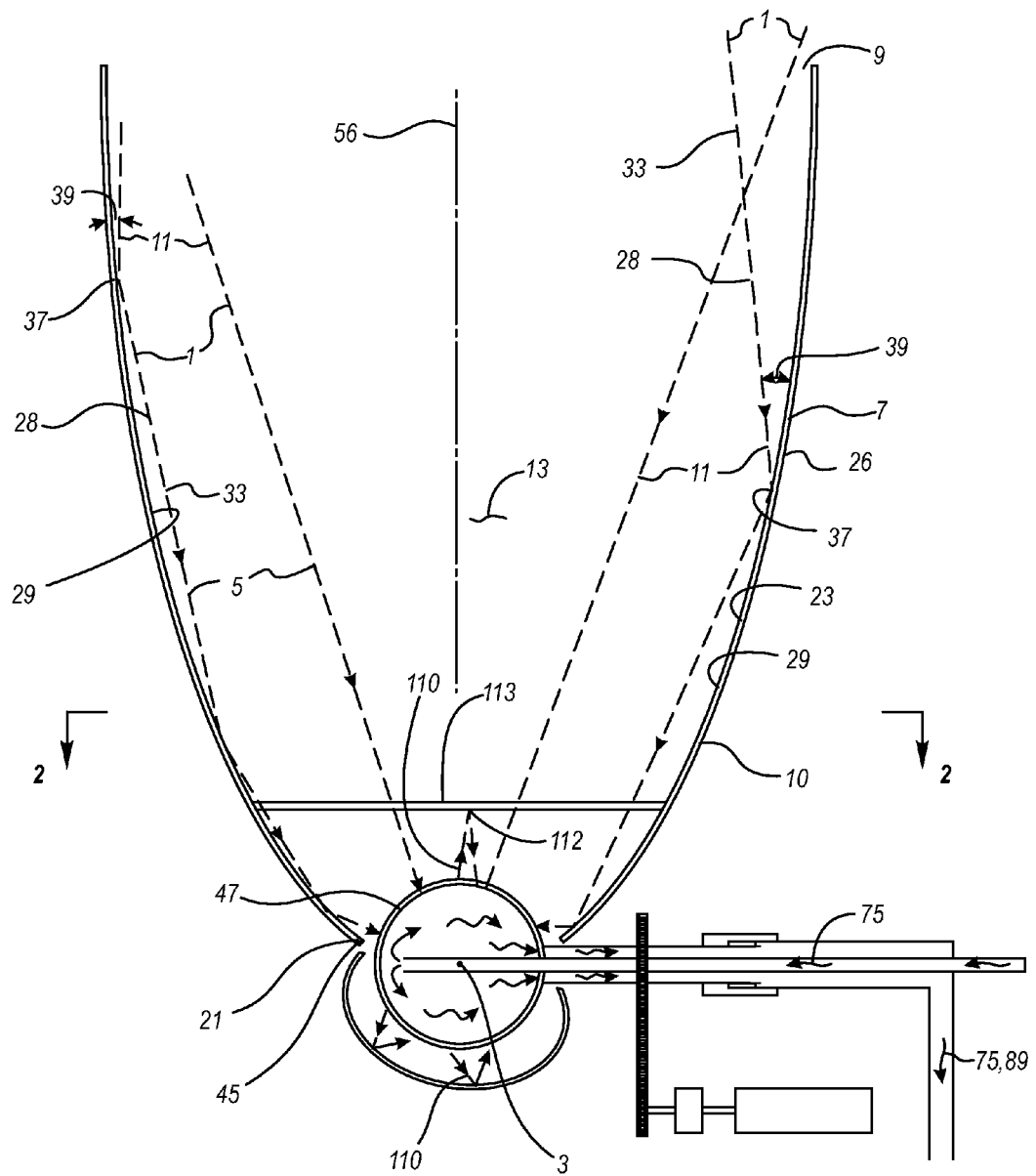
FIG. 3 is a vertical cross-section of a preferred embodiment of a solar receiver of the present invention with a parabolically decreasing chamber diameter.
Figure 4:
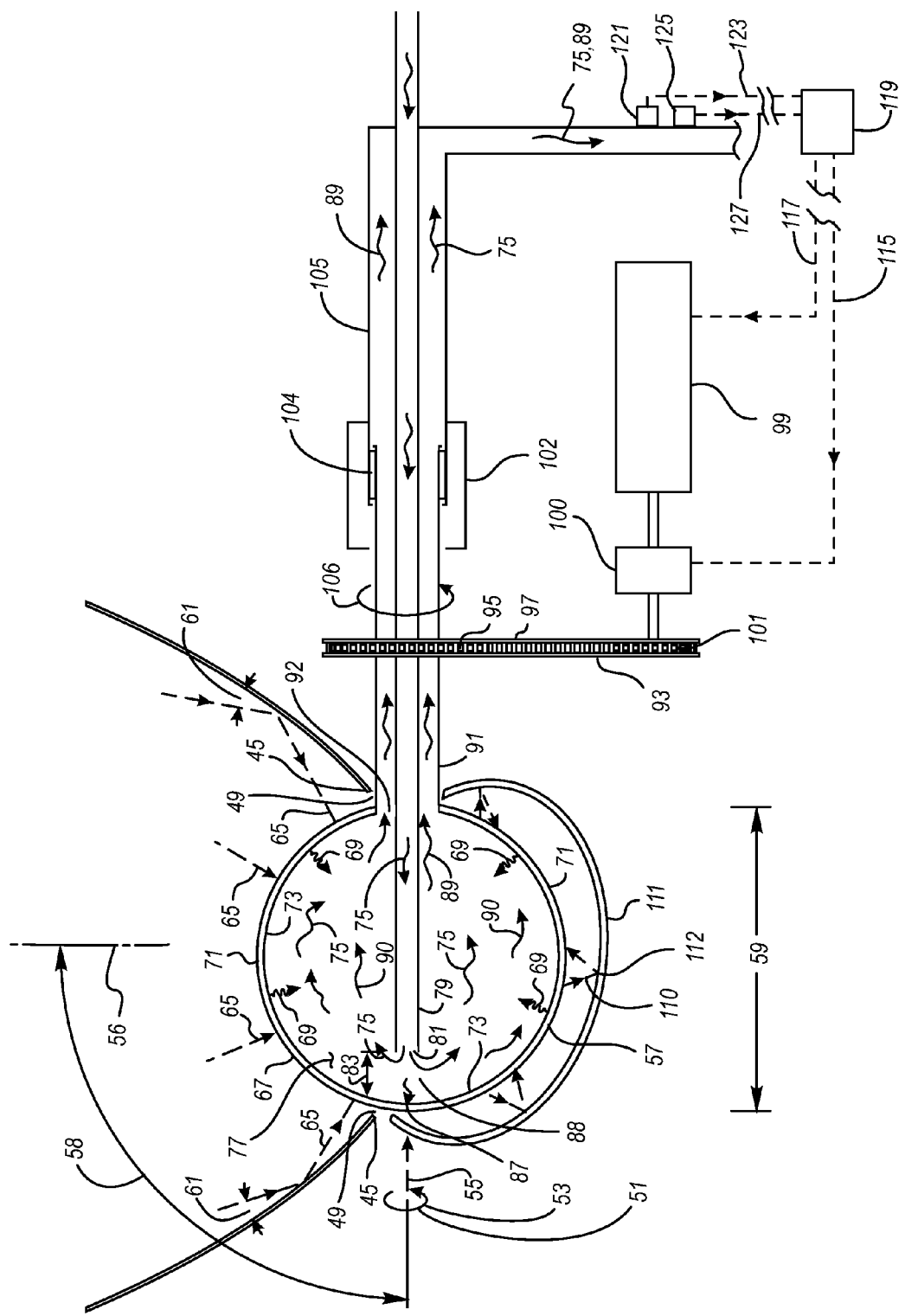
FIG. 4 is a vertical cross-section of a preferred embodiment of a solar absorber and an absorber rotation mechanism of a solar receiver of the present invention.

As shown for the embodiments of the solar receiver 10 in FIG. 1 and FIG. 3, the solar absorber 47 may be positioned at the funnel exit 21 and immediately adjacent to the funnel exit perimeter 45, and may be separated from the funnel exit perimeter 45 by an absorber clearance 49 which allows for absorber independent movement 51 of the solar absorber 47 without contact with the funnel exit perimeter 45. For the embodiment of the solar absorber 47 shown in FIGS. 1-4, the absorber movement 51 will preferably be an absorber rotation 53 of the solar absorber 47 about an absorber rotation axis 55. For the embodiment shown, the absorber rotation axis 55 is perpendicular to the funnel axis 56 which is laterally centered in the receiver funnel 7. For the embodiment of the solar absorber shown in FIGS. 1-4, the solar absorber 47 has a generally spherical shape 57 and the absorber diameter 59 and the absorber clearance 49 are such that regardless of the final reflective angle 61 of a scattered ray 33, all or most of the scattered rays 33 will strike the absorber external surface 67 as shown in FIG. 4. For the purposes of this specification and the claims, the term "spherical" shall be defined to mean spherical or approximately spherical. For preferred embodiments of the solar absorber 47, the absorber external surface 67 will have a texture, color, and a thermal conductivity such as to maximize the absorption of the concentrated funnel radiation 65. Although the rotation angle 58 between the absorber rotation axis 55 and the funnel axis 56 may vary, the optimum rotation angle 58 for distributing the incident concentrated radiation and the resultant heat on the absorber external surface 67 may be approximately ninety degrees for most preferred embodiments.

Referring now to FIG. 4, absorbed energy 69 is transmitted by the absorber wall 71 to the absorber transfer surface 73 where the absorbed energy 69 is transferred by the absorber wall to absorber transfer fluid 75. For the embodiment of the solar absorber shown in FIG. 4, the absorber transfer fluid may be supplied to an absorber fluid chamber 77 by an absorber fluid supply tube 79 having a fluid supply tube discharge 81, which is also the absorber fluid intake for the embodiment shown, positioned a discharge clearance 83 from an absorber fluid discharge contact zone 87. Some of the absorber transfer fluid 75 discharged from the fluid supply tube 79 may initially contact the absorber transfer surface 73 at the discharge contact zone 87 and experience fluid dispersal 88 in the absorber fluid chamber 77. For a preferred embodiment the fluid flow 90 in the absorber fluid chamber 77 will be a turbulent flow providing for better mixing and contact between the absorber transfer fluid 75 and the absorber transfer surface 73. This will provide for more efficient transfer of the absorbed energy 69 into the absorber transfer fluid 75. The heated transfer fluid 89 exits the absorber fluid chamber 77 through the absorber fluid outlet 92, which for the embodiment shown in FIG. 4, is heated fluid exit pipe 91 which is firmly structurally attached to the absorber wall 71. For the preferred embodiment shown in FIG. 4, an absorber rotation drive mechanism 93, which may consist of an exit pipe sprocket 95 attached to the heated fluid exit pipe 91, an absorber rotation chain 97 and a motorized absorber drive 99 which interacts with the absorber drive chain 97 by a drive sprocket 101. A variable speed drive, gear box, or other speed control mechanism 100 may be used to control the rate of absorber rotation 53 of the solar absorber 47. Other drive mechanisms and rotation speed control mechanisms for imparting and controlling exit pipe rotation 106 for the fluid exit pipe 91, and thus imparting absorber rotation 53 to the solar absorber 47 will be obvious to persons of ordinary skill in the art in view of the disclosures made in this specification and the drawings.

For the embodiment shown in FIG. 4, a mechanical seal 102 with a fluid seal 104 between the rotating fluid exit pipe 91 and the fixed absorber fluid discharge pipe 105 provides for the heated transfer fluid 89 to flow from the rotating fluid exit pipe 91 into the fixed absorber fluid discharge pipe 105. The absorber fluid discharge pipe 105 may conduct the heated transfer fluid 89 to the a heat transfer device, steam turbine, or other energy out take system.

Figure 5:
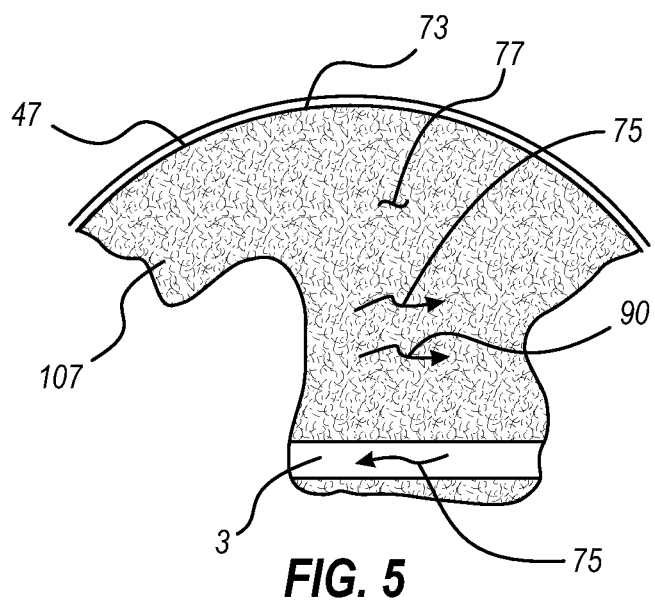
FIG. 5 is a cross-section detail of an optional heat transfer aid of a preferred embodiment of a solar absorber of a solar receiver of the present invention.

Referring to FIG. 5, a preferred embodiment of the solar absorber 47 may incorporate copper wool 107 or other heat transfer aid attached to the absorber transfer surface 73 and extending into the absorber fluid chamber 77. This may substantially aid in the rapid and efficient transfer of heat from the absorber transfer surface 73 into the absorber transfer fluid 75.

Referring again to FIG. 4, a preferred embodiment of the solar receiver 10 may also incorporate an external infrared barrier element 111 positioned to enclose the non-absorbing surface of the solar absorber 47 which has been rotated out of the reflective chamber 13 to reduce the amount of infrared radiation losses from the solar absorber 47 by reflecting 112 the emitted infrared 110 back to the absorber wall 71. The infrared barrier element 111 may also be sealed against the funnel exit perimeter 45 and used to reduce convective losses of heat emanating from the solar absorber 47.

Referring again to FIG. 1, a preferred embodiment of the receiver funnel 7 may also incorporate an internal infrared reflector 113 positioned in the reflective chamber 13. This may be used to reduce the amount of infrared radiation losses from the solar absorber 47 by reflecting 112 the emitted infrared 110 back to the absorber wall 71. The infrared barrier element 113 may also be sealed against the funnel reflective surface 23 and used to reduce convective losses of heat emanating from the solar absorber 47.

Although the solar receiver of the present invention shown in FIGS. 1-5 is a preferred embodiment having a receiver funnel 7 with a circular funnel exit 21 and a spherical solar absorber 47 having an absorber rotation 53 about an absorber rotation axis 55 which is approximately perpendicular to the funnel axis 56 laterally centered in the receiver funnel 7, other embodiments may incorporate a solar absorber of a non-spherical shape which may have an absorber rotation axis which is not necessarily perpendicular to the funnel axis, and the funnel exit may be non-circular and configured to provide for the solar absorber to be movably positioned proximal to the funnel exit and the funnel exit perimeter. The absorber movement drive mechanism provides for moving the solar absorber with respect to the funnel exit and the funnel exit perimeter.

Referring again to FIG. 4, the temperature of the heated transfer fluid 89 may be measured by a transfer fluid temperature sensor 121 which may transmit a fluid temperature signal 123 to an absorber drive controller 119. The flow rate of the heated transfer fluid 89 may also be measured by a transfer fluid flow rate sensor 125 which may transmit a fluid flow rate signal 127 to the absorber drive controller 119. The fluid temperature signal 123 and the fluid flow rate signal 127 may be used by the absorber drive controller 119 to generate and transmit an absorber drive control signal 117 to the motorized absorber drive 99 or a speed control signal 115 to the speed control mechanism 100, or both. Accordingly, the fluid temperature signal 123 and the fluid flow rate signal 127 may be used in the determination of the rate of the absorber rotation 53.

Other embodiments and other variations and modifications of the embodiments described above will be obvious to a person skilled in the art, in view of the disclosures of the specification and the drawings. Therefore, the foregoing is intended to be merely illustrative of the invention and the invention is limited only by the following claims and the doctrine of equivalents.

What is claimed is:

1. Solar receiver for receiving, from a solar collector, focused solar radiation with scatter and to further concentrate and direct the solar radiation with scatter to a solar absorber for absorption, the solar receiver comprising:
   a receiver funnel having a funnel entrance and a funnel exit with a funnel perimeter;
   a solar absorber movably positioned proximal to the funnel exit and the funnel exit perimeter, the solar absorber having an internal absorber fluid chamber, an absorber fluid intake and an absorber fluid outlet; and
   an absorber movement drive mechanism providing for moving the solar absorber with respect to the funnel exit and the funnel exit perimeter.

2. The solar receiver recited in claim 1 further comprising an absorber fluid re-circulation system.

3. The solar receiver recited in claim 1 wherein the receiver funnel has a funnel entrance and a reflective chamber with a circular chamber cross section having a chamber diameter which decreases uniformly from the funnel entrance to the funnel exit.

4. The solar receiver recited in claim 1 wherein the receiver funnel has a funnel entrance and a reflective chamber with a circular chamber cross section having a chamber diameter which decreases parabolically from the funnel entrance to the funnel exit.

5. Solar receiver to receive, from a solar collector, focused solar radiation with scatter and to further concentrate and direct the solar radiation with scatter to a solar absorber for absorption, the solar receiver comprising:
   a receiver funnel having a funnel entrance and a funnel exit with a funnel perimeter;
   a solar absorber having a spherical shape and an absorber rotation axis, the solar absorber being rotatably positioned in the funnel exit and immediately adjacent to the funnel exit perimeter, the solar absorber having an internal absorber fluid chamber, an absorber fluid intake and an absorber fluid outlet; and
   an absorber rotation drive mechanism providing for rotating the solar absorber about the absorber rotation axis.

6. The solar receiver recited in claim 5 further comprising an absorber fluid re-circulation system.

7. The solar receiver recited in claim 5 wherein the receiver funnel has a funnel entrance and a reflective chamber with a circular chamber cross section having a chamber diameter which decreases uniformly from the funnel entrance to the funnel exit.

8. The solar receiver recited in claim 5 wherein the receiver funnel has a funnel entrance and a reflective chamber with a circular chamber cross section having a chamber diameter which decreases parabolically from the funnel entrance to the funnel exit.

9. Method for receiving, from a solar collector, focused solar radiation with scatter and to further concentrating and directing the solar radiation with scatter to a solar absorber for absorption, the method comprising:
   trapping the solar radiation with scatter with a receiver funnel having a funnel entrance and a funnel exit with a funnel perimeter;
   concentrating the solar radiation with scatter to concentrated solar radiation and directing the concentrated solar radiation by the receiver funnel to a solar absorber; and
   absorbing the concentrated solar radiation by the solar absorber, the solar absorber being movably positioned proximal to the funnel exit and the funnel exit perimeter, the solar absorber having an internal absorber fluid chamber, an absorber fluid intake, an absorber fluid outlet, and the solar absorber having an absorber movement drive mechanism providing for moving the solar absorber with respect to the funnel exit and the funnel exit perimeter.

10. The method recited in claim 9 further comprising recirculating absorber fluid through the solar absorber by an absorber fluid re-circulation system.

11. The method recited in claim 9 wherein the receiver funnel has a funnel entrance and a reflective chamber with a circular chamber cross section having a chamber diameter which decreases uniformly from the funnel entrance to the funnel exit.

12. The method recited in claim 9 wherein the receiver funnel has a funnel entrance and a reflective chamber with a circular chamber cross section having a chamber diameter which decreases parabolically from the funnel entrance to the funnel exit.

13. Method for receiving, from a solar collector, focused solar radiation with scatter and to further concentrating and directing the solar radiation with scatter to a solar absorber for absorption, the method comprising:

trapping the solar radiation with scatter with a receiver funnel having a funnel entrance and a funnel exit with a funnel perimeter;

concentrating the solar radiation with scatter to concentrated solar radiation and directing the concentrated solar radiation by the receiver funnel to a solar absorber; and absorbing the concentrated solar radiation by the solar absorber, the solar absorber having a spherical shape and an absorber rotation axis, the solar absorber being rotatably positioned in the funnel exit and immediately adjacent to the funnel exit perimeter, the solar absorber having an internal absorber fluid chamber, an absorber fluid intake, an absorber fluid outlet, and the solar absorber having an absorber movement drive mechanism providing for rotating the solar absorber about the absorber rotation axis.

14. The method recited in claim 13 further comprising recirculating absorber fluid through the solar absorber by an absorber fluid re-circulation system.

15. The method recited in claim 13 wherein the receiver funnel has a funnel entrance and a reflective chamber with a circular chamber cross section having a chamber diameter which decreases uniformly from the funnel entrance to the funnel exit.

16. The method recited in claim 13 wherein the receiver funnel has a funnel entrance and a reflective chamber with a circular chamber cross section having a chamber diameter which decreases parabolically from the funnel entrance to the funnel exit.

\* \* \* \* \*